2,757,190

VINYLISOTHIOCYANATE AND ITS POLYMERIC PRODUCTS

Giffin D. Jones and Robert L. Zimmerman, Midland, Mich., assignors to The Dow Chemical Company, Midland, Mich., a corporation of Delaware No Drawing. Application October 15, 1952,
Serial No. 314,939

1 Claim. (Cl. 260—454)

This invention relates to vinylisothiocyanate and to its polymer and copolymers.

Vinylisothiocyanate,

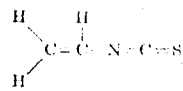

a previously unknown compound, has now been prepared from β-haloethylamine hydrohalide by an initial reaction in the cold in an inert solvent with thiophosgene to form the β-haloethylisothiocyanate, and warming the latter with an excess of a tertiary amine to effect dehydrohalogenation. The new compound has a boiling point near 46° C. at 100 mm. pressure, and near 59° C. at 150 mm. pressure. Its refractive index at 35° C. is 1.5605 and its density at 25° C. is 1.018. The monomeric compound has lachrymatory properties. It decomposes on prolonged contact with water, acids, or primary and secondary alcohols, but is stable when dissolved in tertiary alcohols, ethers, ketones, aromatic hydrocarbons, chlorinated hydrocarbons and other solvents having no active hydrogen.

The new monomer polymerizes under the influence of actinic radiations or heat, and with peroxygen compounds, e. g. peroxides, persulfates, perborates, or percarbonates, or with aliphatic azo compounds such as azo(bis)isobutyronitrile. The polymerization is very rapid and, at temperatures moderately above room temperature, may be essentially complete in two to ten hours or less. When polymerization is effected at or near room temperature, the freshly prepared polymer is soluble in a variety of solvents, including acetone, toluene and dimethyl formamide. When prepared at higher temperatures, or after standing at or above room temperature, the polymer becomes substantially insoluble, due to the effects of cross-linking. The polymer darkens without fusion at about 180° C. Before substantial cross-linking occurs, solutions of the polymer can be used as spinning dopes for the production of fibers, using standard techniques. Due to the presence of the isothiocyanate groups, the fibers are dyed readily. Solutions of the polymer, or emulsions of such solutions may also be used to provide adherent coatings on fabrics, to serve as stiffening or sizing agents, or as anti-shrinking agents, or as fire retardants.

Monomeric vinylisothiocyanate copolymerizes readily with one or more other monoethylenically unsaturated monomers to form initially soluble and thermoplastic copolymers which progressively become less soluble and less plastic as cross-linking occurs. Solutions of the copolymers can be spun into useful and dyeable fibers. The copolymers show the characterizing effect of vinylisothiocyanate when the latter is present in significant amounts of 0.005 mol fraction or more in the copolymer molecule. With some monomers whose homopolymer is water-soluble, such as acrylamide, vinylisothiocyanate forms initially water-soluble copolymers, but this solubility is reduced if the copolymerization temperature is much above room temperature or if the copolymer has aged enough to allow cross-linking to proceed to a significant extent. Copolymers with such monomers as acrylonitrile, styrene, vinylidene chloride, vinyl chloride, or vinyl acetate are insoluble in water from the start. Copolymerization temperatures as high as 100° C. may be used, but those in the range from 30° to 60° C. are preferred.

Copolymers of vinylisothiocyanate with doubly unsaturated compounds, of which butadiene and divinyl ether are typical examples, are highly cross-linked and insoluble materials, though they may be shaped if worked soon enough after the polymerization reaction.

The following examples illustrate the preparation of vinylisothiocyanate and of polymeric derivatives thereof.

Example 1

A solution of one gram molecular weight of thiophosgene in about an equal weight of ether was cooled to 0° C. A solution of 3 mols of β-bromoethylamine hydrobromide in 3 mols of 17 per cent aqueous sodium hydroxide solution was also cooled to 0° C. About one-sixth of the aqueous solution was added to the thiophosgene solution, with stirring. The temperature of the mixture rose to about 18°–23° C., and the mixture was cooled again to 0° C. before each successive addition of the amine, until all of the latter had been added. After thorough mixing, the ether layer was recovered, dried, and distilled. There was obtained 0.63 mol of β-bromoethyl-isothiocyanate, distilling between 102° and 108° C. at 25 mm. pressure. Equimolar amounts of β-bromoethyl-isothiocyanate and of triethylamine were caused to react by adding the isothiocyanate portionwise to the amine which was warmed to 40°–50° C. to initiate reaction. The amine hydrobromide separated from the reaction mixture. The mixture was cooled after reaction was complete, and vinylisothiocyanate was extracted away from the amine hydrobromide with ether. After removing the ether, the new isothiocyanate was recovered in 63 per cent yield by vacuum distillation and had the properties which have been reported above.

Example 2

Vinylisothiocyanate was sealed in an evacuated glass vessel with 1 per cent of its weight of azo(bis)isobutyronitrile. The vessel was heated to 55°–60° C., and polymer began to separate almost at once. After 2 hours the product was found to be soluble in dimethylformamide, from which it was precipitated as a powder by the addition of water. The polymer darkened when heated to 180° C., but did not melt up to 210° C.

Example 3

Ten (10) parts by weight of acrylamide and 1.4 parts of vinylisothiocyanate were dissolved in an inert medium and copolymerization was catalyzed with 0.1 part by weight of azo(bis)isobutyronitrile. The mixture was warmed to about 80° C. for 30 minutes and 11 parts by weight of the copolymeric product was obtained by drying the precipitate formed by addition of methanol to the mixture. The copolymer contained 1.74 per cent sulfur, by weight, or 4.63 per cent vinylisothiocyanate. A 0.5 per cent solution of the copolymer in water at room temperature had a viscosity of 1.080 centipoises. This copolymer was reactive with amino groups. Thus, when tetraethylene pentamine was added to some of the water solution of the copolymer, an exothermic reaction occurred and the reaction product was a gel, insoluble in water, indicating the tendency of such copolymers to form cross-linked or 3-dimensional polymers.

Example 4

A solution was prepared consisting of 0.71 mol acrylamide, 0.006 mol vinylisothiocyanate, 20 mls. water, 30 mls. methanol and 0.1 gram sodium persulfate. Polymerization began at once, and the mixture was heated for 30 minutes at 80° C., becoming very viscous as the polymerization proceeded and the original solution medium evaporated. The copolymer was precipitated from a portion of the concentrate by addition of methanol, and was found to contain 4.20 per cent by weight of copolymerized vinylisothiocyanate. A 0.5 per cent solution of the so-precipitated copolymer in water had a viscosity of 1.089 centipoises at 25° C. The main portion of the viscous copolymeric concentrate was forced through a spinneret into a coagulant bath, forming fibers which were cured and toughened by heating at 160° C. for 15 minutes.

*Example 5*

A solution consisting of 1.9 parts by weight vinylisothiocyanate, 11 parts acrylonitrile and 0.1 part azo(bis)isobutyronitrile was sealed in an evacuated ampoule, and allowed to stand at room temperature for 3 days. The copolymer contained 1.97 per cent of sulfur, by weight, or 5.23 per cent of vinylisothiocyanate, a little over one-third of the theoretical amount if all of the isothiocyanate had entered the copolymer molecule.

*Example 6*

When a series of binary copolymers is made at 60° C. and the indicated mol fraction of vinylisothiocyanate $(M_1)$ to the other monomer $(M_2)$ is maintained, the copolymers have approximately the following compositions:

| Mol Fraction $M_2$ in Monomer Mixture | Mol Fraction $M_2$ in Copolymer | | |
|---|---|---|---|
| | $M_2$=Acrylamide | $M_2$=Acrylonitrile | $M_2$=Styrene |
| 0.1 | 0.18 | 0.07 | 0.18 |
| 0.2 | 0.29 | 0.14 | 0.29 |
| 0.3 | 0.39 | 0.21 | 0.39 |
| 0.4 | 0.46 | 0.28 | 0.46 |
| 0.5 | 0.54 | 0.36 | 0.55 |
| 0.6 | 0.61 | 0.44 | 0.63 |
| 0.7 | 0.68 | 0.53 | 0.70 |
| 0.8 | 0.76 | 0.64 | 0.78 |
| 0.9 | 0.85 | 0.79 | 0.86 |

*Example 7*

In like manner, a monomeric mixture of 0.1 mol vinylisothiocyanate and 0.33 mol vinylidene chloride was copolymerized. The copolymeric product contained 10.3 per cent by weight of sulfur, or 0.3 mol fraction vinylisothiocyanate. The mol fraction of vinylisothiocyanate in the monomer mixture was 0.23 and the two monomers copolymerized at nearly the same rates, with the isothiocyanate having a somewhat more rapid rate.

*Example 8*

A mixture of 0.77 mol vinylisothiocyanate and 4.94 mol vinyl acetate was copolymerized at 60° C. for 7 hours to produce a copolymer containing 2.6 per cent by weight of sulfur, representing 0.07 mol fraction of vinlisothiocyanate as compared with 0.135 mol fraction of this compound in the monomer mixture.

*Example 9*

Vinylisothiocyanate was copolymerized with styrene, in the ratios shown in the following table. After polymerization was complete, the copolymers were dissolved in toluene and reprecipitated by addition of methanol. A solution of 5 grams of each copolymer was prepared in 95 mls. of ethylbenzene, and the viscosities of these solutions were determined. To the solution of copolymer A was added 15 mg. of ethylenediamine and to that of copolymer B was added 8 mg. of the same reagent. Viscosities of the resulting solutions were measured after 24 and 72 hours at room temperature.

| Copolymer | Mol Fraction Vinylisothio-Cyanate | Viscosity Before Adding Amine, cps. | Viscosity After Adding Amine | |
|---|---|---|---|---|
| | | | 24 Hours | 72 Hours |
| A | 0.010 | 34.2 | soft gel | stiff gel. |
| B | 0.005 | 31.8 | 60.1 cps | soft gel. |

Instead of the azo(bis)isobutyronitrile of the examples there may be used various peroxides, persulfates, perborates or percarbonates which are conventional polymerization catalysts. The lower the polymerization temperature, the more readily soluble is the polymeric product when first formed, and the longer it retains a useful degree of solubility. When such volatile solvents as toluene are employed, the solutions may be dry spun to form fibers, and with such solvents as dimethyl formamide, they may be wet spun, with aqueous spinning baths being effective coagulants. The examples have illustrated various binary copolymers, but the invention is not so limited as ternary and quaternary copolymers containing characterizing amounts of at least 0.005 mol fraction of vinylisothiocyanate are prepared in like manner and have similarly advantageous properties.

We claim:

As a new compound, monomeric vinylisothiocyanate, having a boiling point near 46° C. at 100 mm. pressure and near 59° C. at 150 mm. pressure, a refractive index at 35° C. of 1.5605 and a density at 25° C. of 1.018, prepared by warming a β-haloethylisothiocyanate to a reaction temperature near 40°–50° C. with an excess of a tertiary amine.

References Cited in the file of this patent

UNITED STATES PATENTS

| 2,462,433 | Searle | Feb. 22, 1949 |
| 2,606,892 | Kropa | Aug. 12, 1952 |

OTHER REFERENCES

Schildknecht: "Vinyl and Related Polymers," page 638, Wiley & Sons, February 20, 1952.

Semmler: Ann. 241, 128–130 (1887).